April 23, 1940.   G. FISHER   2,198,157
PORTABLE FOLDABLE SEAT
Filed May 4, 1938
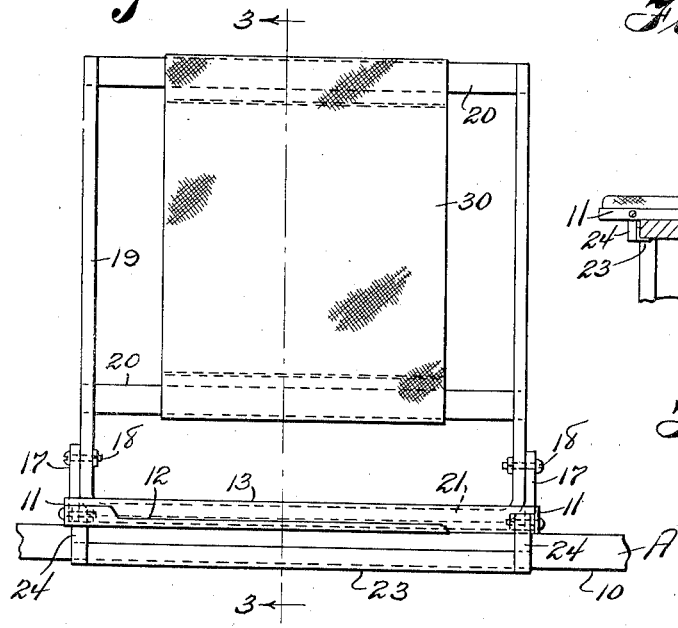
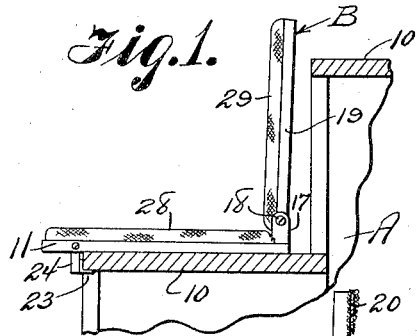
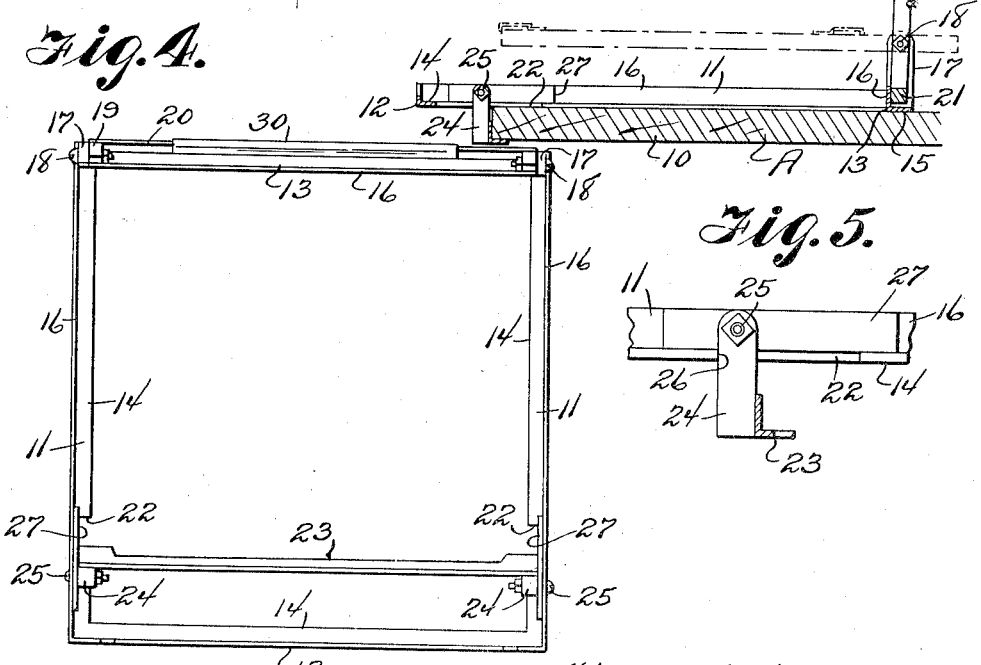
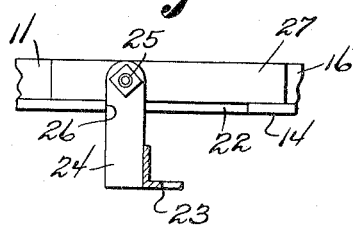
Glenn Fisher INVENTOR
BY Victor J. Evans & Co.
ATTORNEYS Patented Apr. 23, 1940

2,198,157

UNITED STATES PATENT OFFICE 2,198,157

PORTABLE FOLDABLE SEAT

Glenn Fisher, Junction City, Kans.

Application May 4, 1938, Serial No. 206,080

1 Claim. (Cl. 155—133)

The invention relates to a portable seat for benches or the like and more especially to portable, foldable seats.

The primary object of the invention is the provision of a seat of this character, wherein the same is constructed so that it can be attached to a bench or other like structure made from boards or planks found generally at amusement places or public gathering places for the seating of audiences and when in use will support the back of an occupant to assure comfort when used, the seat being readily foldable when not in use and is susceptible of carriage by a person from one locality to another.

Another object of the invention is the provision of a seat of this character, wherein the same can be clamped to a bench or the like at its top for use as an individual seat without liability of displacement thereon when occupied, being light in weight for the convenient portability thereof and is readily foldable and set up at the will of a possessor of the same.

A further object of the invention is the provision of a seat of this character, which is extremely simple in its construction, thoroughly reliable and efficient in operation, convenient for the handling thereof, assuring comfort in its use, strong, durable, when not in use can be stored in the least possible space in that the same folds compactly, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a fragmentary vertical transverse sectional view through a seating stand showing the seat constructed in accordance with the invention applied and in position for occupancy.

Figure 2 is an enlarged front elevation showing a slight modification of the invention.

Figure 3 is a sectional view taken on the line 3—3 of Figure 2 looking in the direction of the arrows.

Figure 4 is a top plan view.

Figure 5 is an enlarged fragmentary side elevation partly in section showing in detail the securing of the seat.

Similar reference characters indicate corresponding parts throughout the several views in the drawing.

Referring to the drawing in detail, particularly Figure 1, A designates generally a portion of a seating stand, being in this instance the step arrangement, and the top or seating area of each step being indicated at 10 for service in seating persons and such arrangement is common to grandstand bleachers erected in amusement parks, for example, baseball and football parks or the like. For association with the top 10 of each step of the stand is the portable, foldable seat B constituting the present invention and hereinafter fully described.

The seat B comprises a seat frame having the angle iron side members 11, the front and rear angle iron members 12 and 13, respectively, these being preferably joined at their meeting ends to effect a rigid metal open frame. The members 11 and 12 have their flanges 14 extending inwardly of the frame while the member 13 has the flange 15 thereof extended outwardly of said frame, these flanges 14 and 15 being in the same plane with each other and at right angles to the upstanding portions 16 of the said members 11, 12 and 13.

Integrally formed with the rear member 13 next to the side members 11 or otherwise joined therewith are upstanding short post-like pivot bars 17 carrying pivots 18 connecting thereto a foldable back in the form of a substantially U-shaped frame 19 having the upper and lower cross braces or rest pieces 20, the closed end 21 of the latter being movable in the path of the upstanding portion 16 of the rear member 13 when the said frame 19 is swung vertically so that this closed end 21 will have contact with the portion 16 of said member 13 and thus the frame will be held in an upright position for a back rest support. In other words, the frame 19 when raised for a back rest support will be limited in its movement, the supporting position being shown in Figure 3 of the drawing by full lines and the folded position of the back rest support by dotted lines.

The inwardly directed flanges 14 of the side members 11 close to the front member 12 are cut away at 22 to provide clearances for a swinging clamp of substantially U form having the substantially L-shaped hooking bar 23 and the swinging side arms 24, these being integrally formed with the said bar and pivoted at 25 to the upstanding portion 16 of the members 11 so that the said bar 23 will swing outwardly of the seat frame for hooking engagement with the forward edge of a bench top or the top 10 of a step of the stand A when the seat frame is superimposed upon this top 10 or such bar 23 may swing inwardly of the seat frame to have the arms 24 align with the side members 11 of said seat frame when the seat is to be folded for disuse upon removal from the stand.

The seat superimposed upon the top 10 of the stand A and its back frame raised with the bar 23 hooked with the top 10 as before stated, the said seat is in a position for occupancy. When the bar 23 has been swung outwardly from the seat frame through the clearances 22, the arms 24 will make contact at 26 with the flanges 14 of the side members 11 and thus the outward swinging of the bar 23 is limited so that this bar 23 through abutment at 26 will be in a position for hooking engagement with the forward edge of the top 10 of the stand A when the seat frame is brought to rest upon the said top. This position can be shifted rearwardly on the top 10 to bring the bar 23 in hooking engagement with the forward edge of said top for the anchorage of the seat therewith.

At the inner sides of the upstanding portion 16 of the side members 11 are reinforcing plates 27, made secure in any manner and are located in bridging relation to the cutaway portions 22 in the flanges 14 of said side members 11 and thus reinforcing the weakened areas of said side members.

In Figure 1 of the drawing there is exhibited with the seat the seat and back cushions 28 and 29, respectively, these being anchored to the frame of the seat in any suitable manner, while in Figures 2 and 3 the back frame 19 has connected to the cross braces thereof a canvas section 30, being a substitute for the cushion 29, and the seat frame devoid of the cushion 28 whence an occupant can be seated directly upon the top 10 of the stand A, bench or the like.

When the seat is not in use, the back frame can be readily folded with relation to the seat frame and the bar 23 and arms 24 folded inwardly of said seat frame bringing the seat into a compact folded condition for the storage of the same and the carrying thereof by a person.

What is claimed is:

A foldable seat for a bench or the like having a top board presenting a forward free edge, comprising a substantially square shaped open seat frame formed with opposite parallel sides, front, and rear members, respectively, upstanding short post-like pivot bars joined with the sides of the seat frame next to the rear member of said frame, a swinging back in the form of a substantially U-shaped frame having upper and lower cross pieces arranged between said pivot bars, pivots fitting said bars and opposite sides of said foldable back, the said rear member of the seat frame being formed with an upstanding portion for engagement of the foldable back when swung upwardly at substantially right angles to the seat frame and having the lowermost end of said back in abutting relation to the upstanding portion, inwardly directed flanges formed on the sides and front members of the seat frame, the flanges on the sides of said seat frame being cut away removed from the front member of said seat frame, swinging arms pivoted to the sides of the seat frame and movable through the cut away portions in the flanges thereof, and a substantially L-shaped hooking bar joined with and between said arm for engaging the top board at its front free edge when the seat frame is superimposed upon said board.

GLENN FISHER.